United States Patent
Islam et al.

(10) Patent No.: US 12,542,140 B2
(45) Date of Patent: Feb. 3, 2026

(54) AUDIO VISUAL SOUND SOURCE SEPARATION WITH CROSS-MODAL META CONSISTENCY LEARNING

(71) Applicants: Md Amirul Islam, Toronto (CA); Seyed Shahabeddin Nabavi, Toronto (CA); Irina Kezele, North York (CA); Yang Wang, Winnipeg (CA); Yuanhao Yu, Markham (CA); Jin Tang, Markham (CA)

(72) Inventors: Md Amirul Islam, Toronto (CA); Seyed Shahabeddin Nabavi, Toronto (CA); Irina Kezele, North York (CA); Yang Wang, Winnipeg (CA); Yuanhao Yu, Markham (CA); Jin Tang, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 163 days.

(21) Appl. No.: 18/507,656

(22) Filed: Nov. 13, 2023

(65) Prior Publication Data

US 2024/0161761 A1 May 16, 2024

Related U.S. Application Data

(60) Provisional application No. 63/424,797, filed on Nov. 11, 2022.

(51) Int. Cl.
*G10L 19/02* (2013.01)
*G10L 25/18* (2013.01)
(Continued)

(52) U.S. Cl.
CPC .......... *G10L 19/0204* (2013.01); *G10L 25/18* (2013.01); *G10L 25/30* (2013.01); *H04N 19/20* (2014.11)

(58) Field of Classification Search
CPC ..... G10L 19/0204; G10L 25/18; G10L 25/30; G10L 21/0272; H04N 19/20;
(Continued)

(56) References Cited

U.S. PATENT DOCUMENTS

2015/0149183 A1* 5/2015 Hennequin ............. G10L 19/26
704/278
2018/0233120 A1* 8/2018 Pluta ....................... G10L 25/90
(Continued)

OTHER PUBLICATIONS

Chatterjee, M et al. "Visual scene graphs for audio source separation" arXiv:2109.11955, in ICCV, 2021.
(Continued)

*Primary Examiner* — Michael N Opsasnick

(57) ABSTRACT

System, method and/or computer readable medium for audio visual sound source Separation that applies cross-modal meta consistency learning. Inputs include an audio spectrogram that represents first sounds second sounds, a first video of a first sound producing object, and a second video of a second sound producing object. Audio features and audio tokens are generated by applying audio encoders to the audio spectrogram. Visual tokens are generated by applying a visual encoder to the first video and the second video. Respective audio-visual features are obtained based on combining the audio token with the respective visual tokens. Based on the respective audio-visual features, first and second separated audio masks are generated by applying a decoder.

18 Claims, 6 Drawing Sheets

(51) Int. Cl.
*G10L 25/30* (2013.01)
*H04N 19/20* (2014.01)

(58) Field of Classification Search
CPC ........... G10H 1/0008; G10H 2210/056; G10H 2220/441; G10H 2250/311
See application file for complete search history.

(56) References Cited

U.S. PATENT DOCUMENTS

| | | | | |
|---|---|---|---|---|
| 2019/0139563 | A1* | 5/2019 | Chen | G06N 3/044 |
| 2022/0101869 | A1* | 3/2022 | Wichern | G10L 21/028 |
| 2022/0310113 | A1* | 9/2022 | Tzinis | G06V 10/82 |
| 2023/0040657 | A1* | 2/2023 | Zheng | H04S 3/008 |
| 2023/0124111 | A1* | 4/2023 | Seo | G10L 25/30 704/270 |
| 2023/0177384 | A1* | 6/2023 | Nagrani | G06N 3/045 706/12 |
| 2023/0419989 | A1* | 12/2023 | Gfeller | G10L 15/063 |
| 2024/0161761 | A1* | 5/2024 | Islam | H04N 19/20 |

OTHER PUBLICATIONS

Chen, D. et al., "Contrastive test-time adaptation". 2022 IEEE/CVF Conference on CVPR.
Chi, Z., et al. "Test-time fast adaptation for dynamic scene deblurring via meta-auxiliary learning" in Proceedings of IEEE Conference on CVPR 2021.
Choi, M., et al. "Scene-adaptive video frame interpolation via meta-learning". in CVPR, 2020.
Ephrat, A. et al. "Looking to listen at the cocktail party: A speaker-independent audio-visual model for speech separation" arXiv preprint arXiv:1804.03619, 2018.
Gan, C. et al. "Music gesture for visual sound separation" In CVPR, 2020.
Gao, R. et al. "Learning to separate object sounds by watching unlabeled video" In ECCV, 2018.
Gao, R. et al. "Co-separating sounds of visual objects" In CVPR, 2019.
Gao, R. et al. "Visualvoice: Audiovisual speech separation with cross-modal consistency" in CVPR, 2021.
Korbar, B. et al. "Cooperative learning of audio and video models from self-supervised synchronization" in NeurIPS, 2018.
Liu, S. et al. "Self-supervised generalisation with meta auxiliary learning", in NeurIPS, 2019.
Lu, J., et al. "ViLBERT: Pretraining task-agnostic visiolinguistic representations for vision-and-language tasks", in NeurIPS, 2019.
Nichol, A. et al. "On first-order meta-learning algorithms" arXiv preprint arXiv:1803.02999, 2018.
Niu, S. et al., "Efficient test-time model adaptation without forgetting", in ICML, 2022.
Park, S., et al. "Few-shot adaptive gaze estimation", in CVPR, 2019.
Park, S. et al. "Fast adaptation to super-resolution networks via meta-learning", in ECCV, 2020.
Rahman, T. et al., "Weakly-supervised audio-visual sound source detection and separation", in ICME, 2021.
Rahman, T. et al., "TriBERT: Full-body Human-centric audio-visual representation learning for Visual Sound Separation", in NeurIPS, 2021.
Rouditchenko, A. et al., "Self-supervised segmentation and source separation on videos", in CVPR Workshops, 2019.
Sun, Y. et al., "Test-time training with self-supervision for generalization under distribution shifts", in ICML, 2020.
Tian, Y. et al., "Cyclic co-learning of sounding object visual grounding and sound separation", in CVPR, 2021.
Vaswani, A., et al., "Attention is all you need", in NeurIPS, 2017.
Wang, D. et al. "Tent: Fully test-time adaptation by entropy minimization", in ICLR, 2021.
Zhao, H. et al., "The sound of motions", in ICCV, 2019.
Zhao, H. et al. "The sound of pixels", in ECCV, 2018.
Zhou, X. et al. "Seco: Separating unknown musical visual sounds with consistency guidance", arXiv preprint arXiv:2203.13535, 2022.
Zhu, L. et al. "Visually guided sound source separation and localization using self-supervised motion representations", in CVPR, 2022.

* cited by examiner

Algorithm 1: Meta-Consistency Learning

Input: Consistency pretrained model parameters, learning rate, $\{\alpha, \beta\}$
Output: Meta-consistency learned parameters, $\theta$ 1 Initialize the model with pre-trained parameters:
$\theta = \{\theta^S, \theta^{Cons}\}$
2 while *not converged* do
3    Sample a batch, $\mathcal{B}$ of audio-visual pairs $\{I^a, I^v\}$
   foreach *pair* $n \in \mathcal{B}$ do
4      while $k \leq$ *inner-loop-iteration* do
5        Evaluate $\nabla_\theta L_{Cons}(f_\theta)$ using consistency loss, $L_{Cons}$ in Eq. 1
6        Compute adapted parameters with gradient descent:
$\theta_n = \theta - \alpha \nabla_\theta L_{Cons}(f_\theta)$
7        Update: $\theta^{Cons} \leftarrow \theta^{Cons} - \alpha \nabla_\theta L_{Cons}(f_\theta)$
8    Evaluate the source separation task and update:
$\theta \leftarrow \theta - \beta \sum_{n=1}^{N} \nabla_\theta L_S(\theta_n^S)$

FIG. 3

Algorithm 1: Meta 2onsistency Learning

Input: Consistency pretrained model parameters
Output: Meta-consistency learned parameters, $\theta$ 1  Initialize the model with pre-trained parameters:
   $\theta = \{\theta^S, \theta^P, \theta^{Cons}\}$
2  while *not converged* do
3     Sample a batch, $N$ of audio-visual pairs $\{I^a, I^v\}$
4     foreach *pair* $(I_n^a, I_n^v) \in N$ do
5       while *iter $\leq$ number of updates, $k$* do
6         Evaluate $\nabla_\theta L_{Cons}$ using Eq. 1
                Compute adapted parameters with GD:
                $\hat{\theta}_n = \theta - \alpha \nabla_\theta L_{Cons}(\mathbf{f}_n^{pred}, \mathbf{f}_n^v; \theta)$
                Update: $\theta^{Cons} \leftarrow$
7         $\theta^{Cons} - \alpha \nabla_\theta L_{Cons}(\mathbf{f}_n^{pred}, \mathbf{f}_n^v; \theta^{Cons})$
8     Evaluate the audio separation task and update:
     $\theta \leftarrow \theta - \beta \sum_{n=1}^N \nabla_\theta L_{mask}(\mathbf{M}_n^S, \mathbf{M}_n^{gt}; \hat{\theta}_n^S, \hat{\theta}_n^P)$

AUDIO VISUAL SOUND SOURCE SEPARATION WITH CROSS-MODAL META CONSISTENCY LEARNING

RELATED APPLICATION DATA

This application claims priority to and the benefit of U.S. Provisional Patent Application No. 63/424,797, "AUDIO VISUAL SOUND SOURCE SEPARATION WITH CROSS-MODAL META CONSISTENCY LEARNING", filed Nov. 11, 2022, the contents of which are incorporated herein by reference.

FIELD

The present application generally relates to audio and video signal processing and in particular to systems, methods and computer media for audio visual sound source separation with cross-modal meta consistency learning.

Background

Full citation data for reference documents mentions in this disclosure by author and year of publication are set out in a list of references at the conclusion of this description. Audio source separation (a.k.a cocktail party problem) is a classic problem in signal processing literature. Early classical methods (Virtanen, 2007), (Smaragdis P. a., 2003), (Cichocki, 2009) rely mostly on Non-negative Matrix Factorization (NMF). However, these methods are not very effective because They rely on low-level correlation in the signals. Recent methods utilize Convolutional Neural Networks (CNNs) to address the underlying challenges of this problem. Simpson et. al (Simpson, 2015), Chandna et. al (Chandna, 2017), and Wang et. al (Wang D. a., 2018) estimate time-frequency masks. Hershey et. al (Hershey, 2016), Yu et. al (Yu, 2017), Takahashi et. al (Mitsufuji, 2019), and Grais et. al (Grais, 2017) proposed Deep clustering, speaker-independent training, a recursive separation, and a two-stage separation for a coarse-to-fine audio separation to address the identity permutation problem respectively. However, it is difficult to gain clear separation for the downstream task due to ignorance of visual guidance.

Considering the limitations of the audio only sound source separation, another line of research aims at incorporating visual information along with sound in order to perform more accurate separation. Early work in this area focus on mutual information (Fisher III, 2000) subspace analysis (Smaragdis P. a., 2003) (Pu, 2017), matrix factorization (Sedighin, 2016), (Parekh, 2017), and correlated onsets (Barzelay, 2007), (Li, 2017) to incorporate visual information for audio-visual sound source separation. Recent work, on the other hand, are mostly deep learning based. These approaches separate visually indicated sounds for various sources including speech (Owens, 2018), (Ephrat, 2018), (Gabbay, 2017), (Afouras, The conversation: Deep audio-visual speech enhancement, 2018), (Afouras, My lips are concealed: Audio-visual speech enhancement through obstructions, 2019), (Chung, 2020), (Gao R. a., Visualvoice: Audio-visual speech separation with cross-modal consistency, 2021), (Rahimi, 2022), objects (Gao R. a., 2018), musical instruments (Zhao H. a., 2018), (Gao R. a., Co-separating sounds of visual objects, 2019), (Zhao H. a.-C., 2019), (Xu, 2019), (Gan, 2020), (Zhu, Visually guided sound source separation using cascaded opponent filter network, 2020), (Tian, 2021), (Chatterjee, 2021), (Zhu, Leveraging category information for single-frame visual sound source separation, 2021), (Rahman, 2021), (Zhu, Visually guided sound source separation and localization using self-supervised motion representations, 2022), (Zhu, V-slowfast network for efficient visual sound separation, 2022), (Ji, 2022)}, and universal purposes (Gao R. a., 2018), (Rouditchenko, 2019). Zhao et. al (Zhao H. a., 2018) introduce PixelPlayer, a framework to learn object sounds and their location in the scene for sound source separation. Gao et. al (Gao R. a., Co-separating sounds of visual objects, 2019) introduce a novel co-separation objective to associate consistent sounds to the objects of the same category across all training samples. Tian et. al (Tian, 2021) propose sounding object visual ground network along with a co-learning paradigm to determine if the object is audible to further separate its source.

Rahman et. al (Rahman, 2021) devise a multi modal transformer to utilize additional modalities along with weak category supervision for audio visual source separation. Zhu et. al (Zhu, V-slowfast network for efficient visual sound separation, 2022) adapt the classical slowfast networks to propose a three-stream slowfast network along with a contrastive objective. The slow network performs source separation at the coarse time scale while the fast residual network refine it.

Meta Auxiliary Learning for Unknown Musical Instrument Source Separation: The goal of auxiliary learning is to enhance the generalization of the primary task (Liu, 2019). The auxiliary task is employed for various purposes including depth completion (Lu K. a., 2020) super resolution (Park S. a., 2020), and deblurring (Chi Z. a., 2021). In addition, meta-learning enables fast test time adaptation via a few training examples. The idea of combining auxiliary learning with meta learning (Finn, 2017) has been explored in existing works (Park S. a., 2019) (Choi, 2020), (Chi Z. a., 2021) (Chi Z. a., 2022); however, it is not explored in the context of audio visual learning.

Tribert, as described in Rahman et. al (Rahman, 2021), adapts a learned visual tokenization scheme based on spatial attention and leverage weak-supervision to allow granular cross-modal interactions for visual and pose modalities by utilizing VilBert (Lu J. a., 2019). The specialized goal of Tribert is to address the downstream task by a model that is not designed to adapt to the novel/unknown musical categories during test time (i.e., test time adaptation is not applicable). Tribert uses various modalities including weak category and pose information.

SeCo, as described in Zhou et. al (Zhou, 2022), focuses on the separation of unknown musical instruments and is based on a "Separation-with Consistency" (SeCo) framework, which is intended to accomplish separation on unknown categories by exploiting the consistency constraints by introducing an online matching strategy. SeCo is not designed nor trained for adaptation in a low-data regime (one sample is the limit).

The solutions described above are generally limited to the scenario where both train and test sets contain similar objects (e.g., musical instruments). In addition, these approaches typically require a large amount of training data. However, music videos in real life consist of various types of musical instrument with distinctive noises. These challenges make it harder for a single audio separation model to separate the sounds on all possible cases during inference. More specifically, prior solutions use same set of trained weights to adapt to all unseen test samples. However, the distribution gap between training and test data is the key factor for generalization. Therefore, generalization remains a crucial step towards utilizing these known solutions in real world scenarios.

There thus exists a need for audio visual sound source separation solutions that overcome one or more of the limitations of existing approaches described above.

SUMMARY

The present disclosure describes devices, systems, methods, and media for audio visual sound source separation with cross-modal meta consistency learning.

According to a first example aspect a method is disclosed for separating sounds that are generated by discrete sound producing objects. The method incudes: receiving an audio spectrogram that represents first sounds generated by a first sound producing object and second sounds generated by a second sound producing object; receiving a first video of the first sound producing object generating the first sounds; receiving a second video of the second sound producing object generating the second sounds; generating an audio feature by applying a first audio encoder to the audio spectrogram; generating an audio token by applying a second audio encoder to the audio spectrogram; generating a first visual token by applying a visual encoder to the first video; generating a first audio-visual (AV) feature by applying a transformer encoder to the audio token and the first visual token; generating a first fused feature that is combination of the first AV feature and the audio feature; generating a first separated audio mask by applying a decoder to the first fused feature; generating a second visual token by applying the visual encoder to the second video; generating a second audio-visual (AV) feature by applying the transformer encoder to the audio token and the second visual token; generating a second fused feature that is combination of the second AV feature and the audio feature; generating a second separated audio mask by applying the decoder to the second fused feature; outputting a representation of the first sounds from the audio spectrogram based on the first separated audio mask; and outputting a representation of the second sounds from the audio spectrogram based on the second separated audio mask.

In some examples of the first aspect, the method includes collectively training the first audio encoder, the decoder, the visual encoder, the second audio encoder and the transformer to generate the first separating audio mask and the second separating audio mask.

In one or more of the preceding examples of the first aspect, the collectively training comprises training an audio visual consistency network to learn a synchronization of the representation of the first sounds from the audio spectrogram with the first video and a synchronization of the representation of the second sounds from the audio spectrogram with the second video.

In one or more of the preceding examples of the first aspect, training the audio visual consistency network comprises: generating a first sound output feature by applying a consistency encoder to the representation of the first sounds; generating a second sound output feature by applying the consistency encoder to the representation of the second sounds; and adjusting parameters of the consistency encoder based on a comparing of the first sound output feature to the first visual token AV featureand and the second sound output feature to the second AV featurevisual token.

In one or more of the preceding examples of the first aspect, collectively training comprises adjusting parameters of the first audio encoder, the decoder, the video encoder and the second audio encoder based on comparing the first separated audio mask and the second separated audio mask to respective ground truth masks.

In one or more of the preceding examples of the first aspect, each of the first audio encoder, the decoder, the video encoder, the second audio encoder and the consistency encoder comprises a respective convolution neural network configured by a respective set of parameter weights.

In one or more of the preceding examples of the first aspect, the collective training comprises: (1) performing a plurality of inner loop training iterations to train the audio visual consistency network, wherein the parameters of the consistency encoder are adjusted during each inner loop training iteration based on a first defined loss objective; (2) at the completion of each inner loop training iteration, performing an outer loop training iteration adjusting parameters of the first audio encoder, the decoder, the video encoder and the second audio encoder based on a second defined loss objective; and (3) repeating (1) and (2) until a defined convergence criteria is reached.

In one or more of the preceding examples of the first aspect, the transformer encoder comprises a co-attention layer for generating the first AV feature and the second AV feature.

In one or more of the preceding examples of the first aspect, the method includes mixing a first audio signal associated with the first video and a second audio signal associated with the second video to provide the audio spectrogram.

In one or more of the preceding examples of the first aspect, the first sound producing object and the second sound producing object are respective musical instruments.

In a second example aspect, a computer system is disclosed that is configured to separate sounds that are generated by discrete sound producing objects, the computer system comprising one or more processing units configured by executable instructions to perform the method of any of the preceding examples of the first aspect.

In a third example aspect, a non-transient computer readable medium containing program instructions is disclosed for causing a computer to perform a method of separating sounds that are generated by discrete sound producing objects, the method comprising of any of the preceding examples of the first aspect.

BRIEF DESCRIPTION OF THE DRAWINGS

Reference will now be made, by way of example, to the accompanying drawings which show example embodiments of the present application, and in which:

FIG. 3 is an example of a method (illustrated as a pseudocode software algorithm) that can be implemented on the architecture of FIG. 2;

FIG. 4 is a further example of a method (illustrated as a pseudocode software algorithm) that can be implemented on the architecture of FIG. 2;

Similar reference numerals may have been used in different figures to denote similar components.

DESCRIPTION OF EXAMPLE EMBODIMENTS

Figure 1:
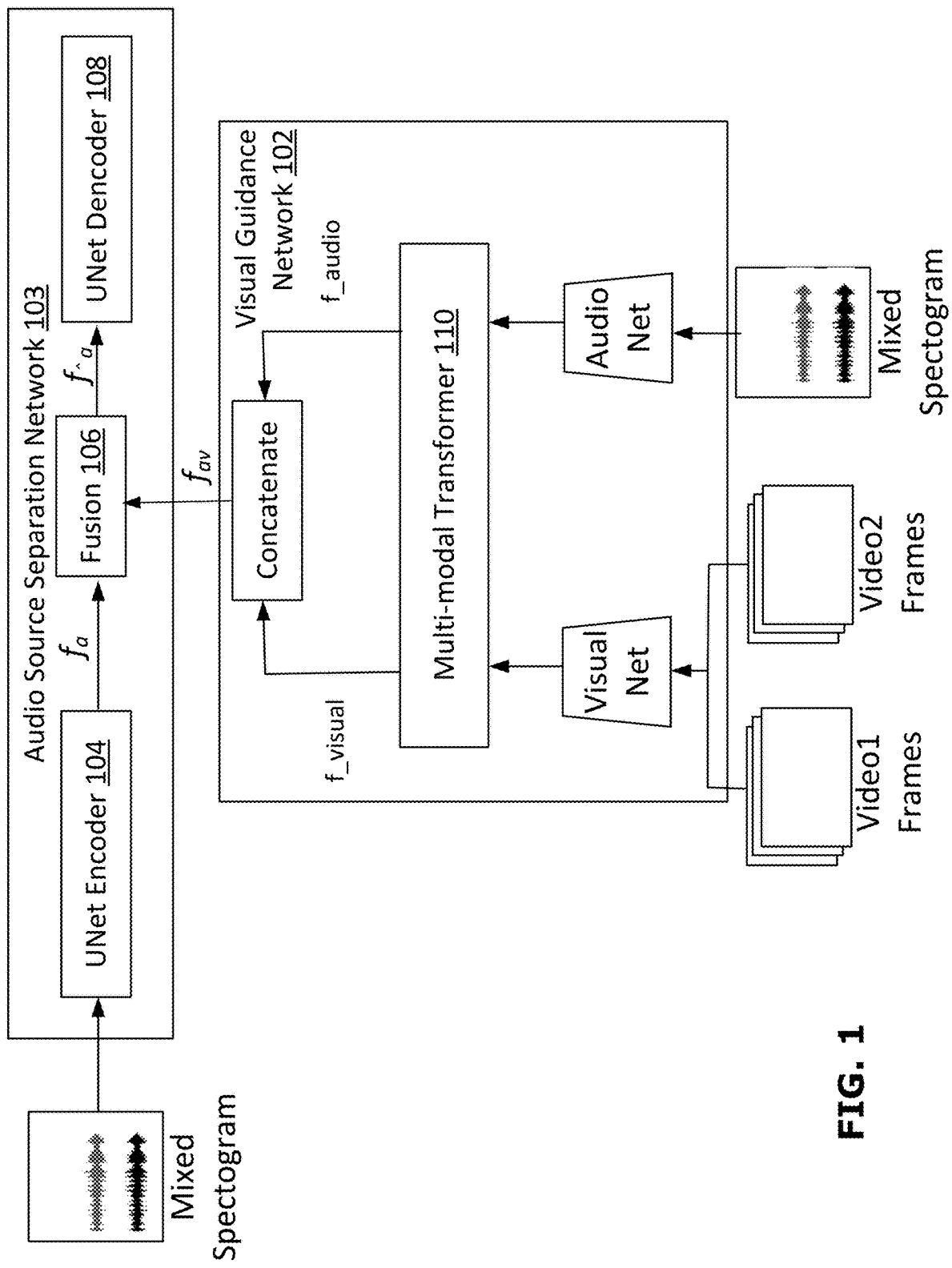
FIG. 1 is a schematic block diagram of an architecture to which examples of the present disclosure can be applied.

The present disclosure describes example devices, systems, methods, and media for providing machine learning models that perform audio visual sound source separation, using cross-modal meta consistency learning.

A solution is disclosed for visually guided audio source separation in the context of both known and unknown musical instruments. A meta-consistency driven fast test time adaptation is disclosed that enables a pretrained model to quickly adapt on unknown test music videos and brings persistent improvements. In example implementations, the methods and techniques disclosed herein can be extended to separating sounds from different non-musical instrument sound sources within audiovisual data, for example from different humans, animals and other sound sources that are each associated with discrete objects within a video stream.

As noted above, the distribution gap between training and test data is the key factor for generalization such that generalization remains a crucial step towards utilizing known solutions in real world scenario. To tackle this issue, one can make a model adaptive to specific input samples. The present disclosure describes systems and methods whereby additional internal information is utilized of each test sample separately which is available at test time by customizing the model. In other words, the disclosed solution is directed to achieving fast adaptation during test time which can quickly adapt to unseen video via auxiliary learning.

Acronyms and Abbreviations used herein may include:
LTE: Long Term Evolution
DL: Deep Learning
CNN: Convolutional Neural Network
MAML: Model Agnostic Meta Learning
SOTA: State of the Art
FPS: Frame Per Second
AVSS: Audio-Visual Sound Source Separation As used herein, the following terms can mean the following unless the context requires a different meaning:
VilBert Transformer: A language model that is extensively adapted in computer vision.
Meta learning: The use of machine learning algorithms that learn how to best combine the predictions from other machine learning algorithms in the field of ensemble learning.
Bimodal/Trimodal Transformers: A transformer with more than one modality as an input. The modalities are fused together through the attention mechanism of transformers.
Auxiliary task: A complementary task that has positive effect on the convergence of the learning model to the point where the primary task is done more accurately.
Spectrogram: a visual representation of the spectrum of frequencies of a signal as it varies with time.
Audio: a digital representation of sound over time.
Video: a digital representation of images over time, typically in the form of a sequence of image frames.
Feature: a tensor (e.g., vector, matrix, map) of embeddings that are generated by a neural network (NN) as a representation of an input tensor.
Token: a tensor (e.g., vector, of embeddings that are generated by a neural network (NN) as a representation of an input sequence
Mask: a binary tensor (e.g., matrix or map).

FIG. 1 shows a system architecture or scenario to which the present disclosure can be applied, according to an example implementation. The inputs provided to the system architecture represented in FIG. 1 include two video inputs (Video1 Frames and Video2 Frames), and an audio input in the form of a mixed spectrogram that represents the combined audio associated with the two video inputs. The goal of the system architecture is to separate the sounds associated with the two video inputs and compute video/audio embeddings. The outputs include separated audio for the two video inputs. A visual guidance network 102 (including a Multi-modal Transformer Network 110) extracts multi-modal representation $f_{av}$ from the video frames and mixed spectrogram. The mixed spectrogram is also fed into an audio source separation network 103, which includes an encoder 104 that generates an encoded audio feature, $f_a$. Then, the multi-modal representation, feature $f_{av}$, is combined (e.g., using a fusion operation 106) with the audio feature, $f_a$, resulting in a guided audio feature map, $\hat{f}_a$. A decoder 108 of the audio source separation network takes $\hat{f}_a$ as input and generates separated audio masks $\{M_{\{av_1\}}\}$, $\{M_{\{av_2\}}\}$. Finally, the separated audio masks are multiplied by the mixed spectrogram, $S_m$, and an inverse Short Time Fourier Transform (STFT) is applied to generate the clean separated audio signals. The overall architecture mentioned above is present in many proposed methods in this area. Therefore, the disclosed method is applicable to any method with such or similar setup.

An example of a model architecture of an audio-visual source separation network (AVSSN) 200, illustrated in FIG. 2, will now be described, according to example implementations. A meta-auxiliary training and testing methodology will then be described, according to example implementations.

AVSSN 200 includes a plurality of software enabled machine learning based neural network (NN) elements, including for example a first audio encoder 206 and a decoder 214 that are elements of an audio source separation network 203; a visual encoder 204, second audio encoder 208 and multimodal transformer 210 that are elements of a visual guidance network 202; and a consistency encoder 218 that is part of a consistency network 216. In example embodiments, these NN based elements are collectively configured by a set of learnable parameters θ that are described in greater detail below.

Based on (Zhao H. a.-C., 2019), (Gao R. a., Co-separating sounds of visual objects, 2019), (Tian, 2021), (Gao R. a., Visualvoice: Audio-visual speech separation with cross-modal consistency, 2021), (Rahman, 2021), (Zhu, Visually guided sound source separation and localization using self-supervised motion representations, 2022), the "mix and separation" technique has been adopted to train the model architecture (e.g., AVSSN 200) in self-supervised manner. Given two video clips $\{V_1, V_2\}$ with associated audio signals $\{A_{\{v_1\}}, A_{\{v_2\}}\}$, the audio signals are mixed to generate a synthetic mixed signal, $A_{\{V_{mix}\}} = A_{\{V_1\}} + A_{\{V_2\}}$. As per (Zhao H. a., 2018), (Zhao H. a.-C., 2019), (Gao R. a., Co-separating sounds of visual objects, 2019), (Tian, 2021), (Gao R. a., Visualvoice: Audio-visual speech separation with cross-modal consistency, 2021), (Rahman, 2021), (Zhu, Visually guided sound source separation and localization using self-supervised motion representations, 2022), a Short Time Fourier Transform (STFT) is applied on the raw mixed signal to generate a log spectrogram representation, $S_m$ for ease of training.

Components of the AVSSN 200 are as follows.

Audio Source Separation Network 203: Following existing works (Zhao H. a., 2018), (Zhao H. a.-C., 2019), (Gao R. a., Co-separating sounds of visual objects, 2019), (Gao R. a., Visualvoice: Audio-visual speech separation with cross-modal consistency, 2021), (Rahman, 2021) (Zhou, 2022), audio source separation network (ASSN) 203 is implemented using an attention U-Net (Ronneberger, 2015) style encoder 206-decoder 214 network with skip connection 207 to generate separated audio mask s $M_{V_1}$, $M_{V_2}$. In an example implementation the U-Net ASSN 203 contains seven convolutions and seven deconvolutions layers. The encoder 206 of attention U-Net ASSM 203 takes the mixed audio spectrogram, $S_m \in R^{1 \times 256 \times 256}$, as input and extracts an audio feature map, $f_a \in R^{1024 \times 16 \times 16}$.

A respective separated audio mask (e.g., masks $M_{v1}$ and $M_{v2}$) is predicted for each sound generating object represented the respective input videos (e.g., videos $V_1$ and $V_2$) as follows. In the case of separated audio mask $M_{v1}$, the encoded audio representation, feature map $f_a$, is combined with the multi-modal representation, feature $f_{av1}$ (obtained from visual guidance network 202, as described below) with a self-attention based fusion technique (as used in (Gan, 2020) (Rahman, 2021)). In some examples, before the fusion 212, the dimensions of audio feature map $f_a$ and multi-modal feature $f_{av1}$ are adjusted. The resulting fused feature, $\hat{f}_{a1}$, is fed into the decoder 214 of attention U-Net ASSM 203, which predicts the final magnitude of an audio spectrogram mask. Finally, the predicted audio spectrogram mask is activated via a sigmoid function to obtain the predicted separated audio mask $M_{V1}$. Similarly, in the case of separated audio mask $M_{V2}$, the encoded audio representation, feature map $f_a$, is combined with the multi-modal representation, feature $f_{av2}$ (also obtained from visual guidance network 202, as described below) with a self-attention based fusion 212. As noted above, in some examples, before the fusion 212, the dimensions of audio feature map $f_a$ and multi-modal feature $f_{av2}$ are adjusted. The resulting fused feature, $\hat{f}_{a2}$, is fed into the decoder 214 of attention U-Net ASSM 203, which predicts the final magnitude of an audio spectrogram mask. The predicted audio spectrogram mask is activated via a sigmoid function to obtain the predicted audio separation mask $M_{V2}$.

For the sound separation task, a goal is to learn separate spectrogram masks for each individual object (i.e., each individual sound source). Thus, a respective separation loss, $L_{mask\_prediction}$, is applied between each of the predicted separation masks $M_{V1}$, $M_{V2}$ and a binary ground-truth mask. The separation loss, $L_{mask\_prediction}$ uses a per-pixel sigmoid cross entropy objective. Following (Zhao H. a., 2018) (Zhao H. a.-C., 2019) (Gao R. a., Co-separating sounds of visual objects, 2019) (Tian, 2021) (Rahman, 2021), (Zhu, Visually guided sound source separation and localization using self-supervised motion representations, 2022)}, the binary ground truth mask for each video is calculated by observing whether the target sound is the dominant component in the mixed sound. This loss provides the main supervision to enforce the separation of clean audio for a target sound from the mixed sound.

Visual Guidance Network 202: The visual guidance network 202 is based on ViLBERT (Lu J. a., 2019) and TriBERT (Rahman, 2021). ViLBERT is a two stream architecture which jointly learn from image and text while TriBERT extended ViLBERT's architecture to three stream, vision, audio, and pose to learn a human-centric audio visual representation. In contrast, the presently disclosed solution uses a two-stream visual guidance network to learn an audio visual representation (e.g., feature $f_{av1}$ in the case of video $V_1$, and feature $f_{av2}$ in the case of video $V_2$). Unlike visual guidance network in existing works which only use visual cues, the guidance network 202 of the present disclosure takes both video frames and mixed audio spectrogram as input and outputs a joint audio-visual representation which is used to guide the source separation network. Similar to (Lu J. a., 2019) (Rahman, 2021) (Rahimi, 2022), a bi-directional transformer encoder (Vaswani, 2017) is used as the backbone of the guidance network 202. Visual tokens are first generated by directly feeding video frames (e.g., video $V_1$ or Video $V_2$) to a CNN architecture (visual encoder 204). A tiny network (audio encoder 208) is then applied (Simonyan, 2014) on mixed audio spectrogram $S_m$ to generate the audio tokens. The two sets of tokens are fed to the multi-modal transformer encoder 210, which refines them using bi-modal co-attention to output multi-modal representation (e.g., feature $f_{av1}$ in the case of video $V_1$, and feature $f_{av2}$ in the case of video $V_2$).

Visual Representations: TriBERT (Rahman, 2021) used an end-to-end segmentation network which outputs detected object features to feed into multi-modal transformer. In contrast, the presently disclosed solution directly uses input frames for each video separately to extract global semantic representation rather than using detected bounding box features (e.g. (Tian, 2021) (Gao R. a., Co-separating sounds of visual objects, 2019) (Rahman, 2021)). The 2D ResNet-50 architecture (He, 2016; He, 2016) is used as the visual analysis network (e.g., visual encoder 204) which takes input video, $V \in R^{T_v \times 3 \times 256 \times 256}$ as input ($T_v$ denotes total number of frames), and outputs a 1024 dimensional feature vector after the last spatial average pooling layer. The feature vector is then reshaped along the temporal dimension (i.e., number of video frames) and the resultant 3×1×1024 dimensional visual embedding is fed to the multi-modal transformer 210 as visual token, where 3 corresponds to the number of frames.

Audio Representations: The mixed audio spectrogram, $S_m \in R^{1 \times 256 \times 256}$ is fed to a tiny VGG-like (Simonyan, 2014) architecture (e.g., audio encoder 208) which outputs the high-level global audio embedding. The audio embedding is repeated to generate audio sequences which are used as tokens for multi-modal transformer 210.

Bi-modal Co-attention: Following (Lu J. a., 2019) (Rahman, 2021) (Rahimi, 2022), a bimodal co-attention layer in the transformer encoder 210 is used to learn effective representation. While TriBERT (Rahman, 2021) extends the ViLBERT's (Lu J. a., 2019) co-attention layer to take intermediate representation of three different modalities, the present solution is extended to take intermediate vision and audio representation as input. The rest of the transformer encoder 210 architecture is kept similar to ViLBERT. The resultant audio-visual representation is used to guide the encoded features from the ASSN 203. In the illustrated example, guidance network 202 does not use any audio level category information or other modality as used in TriBERT.

Cross-Modal Consistency Network 216: In addition to an audio source separation task (e.g., as provided by the combination of ASSN 203 and visual guidance network 202, collectively referred to as the primary source separation network 250), in example implementations a self-supervised auxiliary task is applied to complement the primary separation task in a way that can be used to adapt the network on test samples. In addition to a use scenario of separating audio for known musical instruments, there is also the more challenging scenario of separating audio corresponding to unknown musical (and other sound source) categories by achieving stronger adaptation ability. Based on existing works (Korbar, 2018) (Nagrani, 2018) (Kim, 2018) (Zhou, 2022), an audio-visual consistency network 216 is disclosed for learning the synchronization of video and corresponding separated audio. The consistency network 216 may capture the audio-visual correlation when adapted to new samples leading to better source separation result. Note, the auxiliary audio-visual consistency task is self-supervised so it can be used for test time adaption.

To learn audio-visual synchronization, inter-modal consistency is used (Korbar, 2018) (Nagrani, 2018) (Gao R. a., Visualvoice: Audio-visual speech separation with cross-modal consistency, 2021) (Zhou, 2022) based on the predicted separated audio masks from the separation network 250. The predicted separated audio mask s $M_{V1}$, $M_{V2}$ are each multiplied by the mixed audio spectrogram $S_m$, to obtain the separated audio spectrograms, $\{S_{V_1}\}^{pred}$, $\{S_{V_2}\}^{pred}$. For a consistency computation, a ResNet18 (He, 2016) encoder 218 is further used to extract high-level features from the separated masks as comparing the raw spectrogram with high-level visual features obtained from the visual guidance network is not every informative. In particular, ResNet18 encoder 218 is used to encode the two the separated audio spectrograms, $\{S_{V_1}\}^{pred}$, $\{S_{V_2}\}^{pred}$ into a lower dimensional embedding space suitable for direct comparison with the multi-modal (e.g., audio-visual) embeddings (features $f_{av1}$, $f_{av2}$) obtained by the visual guidance network 202. The consistency network 216 takes the separated audio spectrograms, $\{S_{V_1}\}^{pred}$ and $\{S_{V_2}\}^{pred}$ as inputs and it outputs respective 256 dimensional consistency embedding, feature $\{f_{V_1}\}^{pred}$, and feature $\{f_{V_2}\}^{pred}$ for each mask (i.e., each separated audio spectrogram) separately. Similar to (Korbar, 2018) (Gao R. a., Visualvoice: Audio-visual speech separation with cross-modal consistency, 2021) (Zhou, 2022), the audio-visual associations in videos are learned in a straight-forward efficient way where the training objective is to minimize the distance of the positive pairs while maximize the distance for negative pairs. In particular, the synchronized audio-visual samples (i.e, the separated audio embedding and their corresponding visual embedding) as positive pair $f_i^{pred}$, $f_i^v$ where $i \in V_1, V_2$ and $V_1, V_2$ are two different videos are considered with an objective of minimizing the distance within a positive pair. Additionally, negative pairs, obtained by cross pairing the audio and visual embedding, $f_i^{pred}$, $f_j^v$ where $i \neq j$ and $(i, j) \in \{V_1, V_2\}$, are also considered, with the objective of maximizing the distance between a negative pair.

In an example implementation, the overall audio-visual consistency loss can be defined by the following:

$$L_{Cons} = L_2(f_1^{pred}, f_1^V) + L_2(f_2^{pred}, f_2^V) - L_2(f_1^{pred}, f_2^V) - L_2(f_2^{pred}, f_1^V) \quad (1)$$

This loss forces the overall AVSSN 200 to learn cross-modal visual audio embeddings such that the distance between the embedding of the separated music and the visual embedding for the corresponding musical instrument should be smaller than that between the separated audio embedding and the visual embedding for the other musical instrument.

The audio separation results at the beginning of training may not be rich enough to learn audio-visual association, in fact it is likely to confuse the network to identify positive and negative pairs. To address this limitation, following (Korbar, 2018; Zhou, 2022) ground-truth audio features are incorporated to help the association learning process. In one example, clean audio masks, $S_{V_1}$, $S_{V_2}$, are passed to the consistency network 216 and embeddings, $f_{V_1}^{GT}$, $f_{V_2}^{GT}$ are generated More specifically, ground-truth audio masks $S_{V_1}$, $S_{V_2}$, are passed to the consistency network 216 and embeddings $f_{V_1}^{GT}$, $f_{V_2}^{GT}$ are generated to include an additional loss term, $\lambda = \delta(L2(f_{V_1}^{GT}, f_{V_2}^{GT}) + L2(f_{V_1}^{GT}, f_{V_2}^{GT}))$ for regularization in Eq. 1. Note that the regularizer $\lambda$ is only used at the beginning of the learning process to help "warm-start" the learning, and is excluded during meta-consistency training and test time adaptation (described below). The weight $\delta$ decays fast over the course of training The overall loss function for training is as follows:

$$L = L_{mask} + \gamma * (L_{Cons} + \lambda) \quad (2)$$

where $\gamma$ is the weight for the consistency loss. In some examples, all the embeddings are normalized before consistency computation.

Meta-Consistency Learning for Audio Visual Source Separation (AVSS): Existing works (Wang D. a., 2021) (Zhou, 2022) (Azimi, 2022) (Chen, 2022) utilize online matching strategy also termed as 'test-time adaptation' which encourages model adjustment to adapt to unknown samples during inference. The goal is to make explicit adjustments by fine-tuning the model parameters for each test sample based on the error signals from self-supervised auxiliary loss. Since the adaptation process does not require any ground-truth information, it is also known as a self-correction mechanism. However, there exist works (Park S. a., 2019) (Choi, 2020) (Chi Z. a., 2021) (Chi Z. a., 2022; Zhong, 2022; Wu, 2022) which pointed out that naively applying test-time adaptation as in (Sun, 2020) (Zhou, 2022) drives to catastrophic forgetting as the parameters updated via self-supervised loss is biased towards improving the auxiliary self-supervised task rather than the primary task. To address this limitation, existing works (Park S. a., 2019) (Choi, 2020) (Chi Z. a., 2021) (Chi Z. a., 2022) (Zhong, 2022) (Wu, 2022) introduced a learning framework which integrates meta learning with auxiliary self-supervised learning.

In example implementations, meta-consistency training framework is applied for audio-visual sound source separation with the goal of further improving the separation results and adopting to test/unknown samples. For audio source separation, a meta task is defined as performing audio separation on an audio visual pair.

The overall meta-consistency training pipeline is presented in Algorithm 1 (FIG. 3). The model parameters are initialized from the consistency pre-trained model which is already capable of separating sounds. During meta-consistency learning, the constraint is enforced such that the parameters update via the cross-modal consistency loss should improve the source separation task.

A further example of a meta-consistency training pipeline is presented in Algorithm 2 (FIG. 4).

In the example of FIG. 4, the learnable model parameters for AVSSN 200 are denoted as $\theta = \{\theta^S, \theta^P, \theta^{Cons}\}$ where $\theta^P$ denotes the weights for the primary source separation network 250 (e.g., visual guidance network 202 and audio source separation network 203), $\theta^{Cons}$ denotes the weights for the auxiliary audio-visual consistency network 216 and $\theta^S$ denotes shared weights that are the set of parameters from the AVSSN 200 model that are shared by both the primary source separation network 250 and the auxiliary audio-visual consistency network 216. In an example embodiment, the model parameters $\theta = \{\theta^S, \theta^P, \theta^{Cons}\}$ are initialized with parameters from a pre-trained audio-visual separation model that is already capable of separating audios. During meta-consistency learning, an enforced constraint is that the parameter update via the cross-modal consistency loss (Eq. 1) should improve the audio separation task.

It will be noted that the primary source separation network 250 primary source separation network 250 weights $\theta^P$ used to perform the primary audio separation task are also relevant for the auxiliary task performed by audio visual (AV) consistency network 216 since the auxiliary consistency task uses the output from the primary separation task. As indicated in FIG. 4, gradient update iterations each sample audio visual pair are denoted as inner loop training 404 and the meta-update iterations are denoted as outer loop training 402. During the inner loop training, given an audio visual pair and the parameters $\theta$ of a pre-trained model, a small number of gradient updates are performed on the input pair using the consistency loss:

$$\hat{\theta}_n = \theta - \alpha \nabla_\theta L_{Cons}(f_n^{pred}, f_n^V; \theta), \quad (3)$$

where $\alpha$ is the adaptation learning rate, and $f^{pred}_n$, $f^V_n$ refer to audio and visual embeddings, respectively. Here, $\hat{\theta}_n$ involves all the model parameters, $\{\theta^S_n, \theta^P_n, \theta^{Cons}_n\}$. The training objective is to force the updated shared and primary network parameters $\theta^S_n, \theta^P_n$ to enhance the audio separation task performed by primary source separation network 250 by minimizing the separation loss, $L_{mask}$. The meta-objective is defined as:

$$\min_{\theta^S, \theta^P} \sum_{n=1}^N L_{mask}\left(M_n^S, M_n^{gt}; \hat{\theta}_n^S, \hat{\theta}_n^P\right), \quad (4)$$

where separation loss $L_{mask}$ is a function of $\hat{\theta}_n$ but the optimization is over $\theta$. $M^S_n$, $M^{gt}_n$ refer to the predicted and the ground-truth audio masks, respectively. The meta-objective in Eq. 4 can be minimized as follows:

$$\theta \leftarrow \theta - \beta \sum_{n=1}^N \nabla_\theta L_{mask}\left(M_n^S, M_n^{gt}; \hat{\theta}_n^S, \hat{\theta}_n^P\right), \quad (5)$$

where $\beta$ is the meta learning rate. A mini-batch is used for Eq. 5. Note that only consistency network parameters, $\theta^{Cons}$, are updated in the inner loop 404 while audio separation network parameters, $\theta^S$ and $\theta^P$, are updated in the outer loop 402.

During meta-testing, given an audio visual pair, the adapted parameters $\hat{\theta}$ are obtained by applying Eq. 3. The final separation masks are obtained from the adapted parameters $\hat{\theta}$. The model parameters are switched back to the original meta-trained state before evaluating the next pair.

Figure 5:
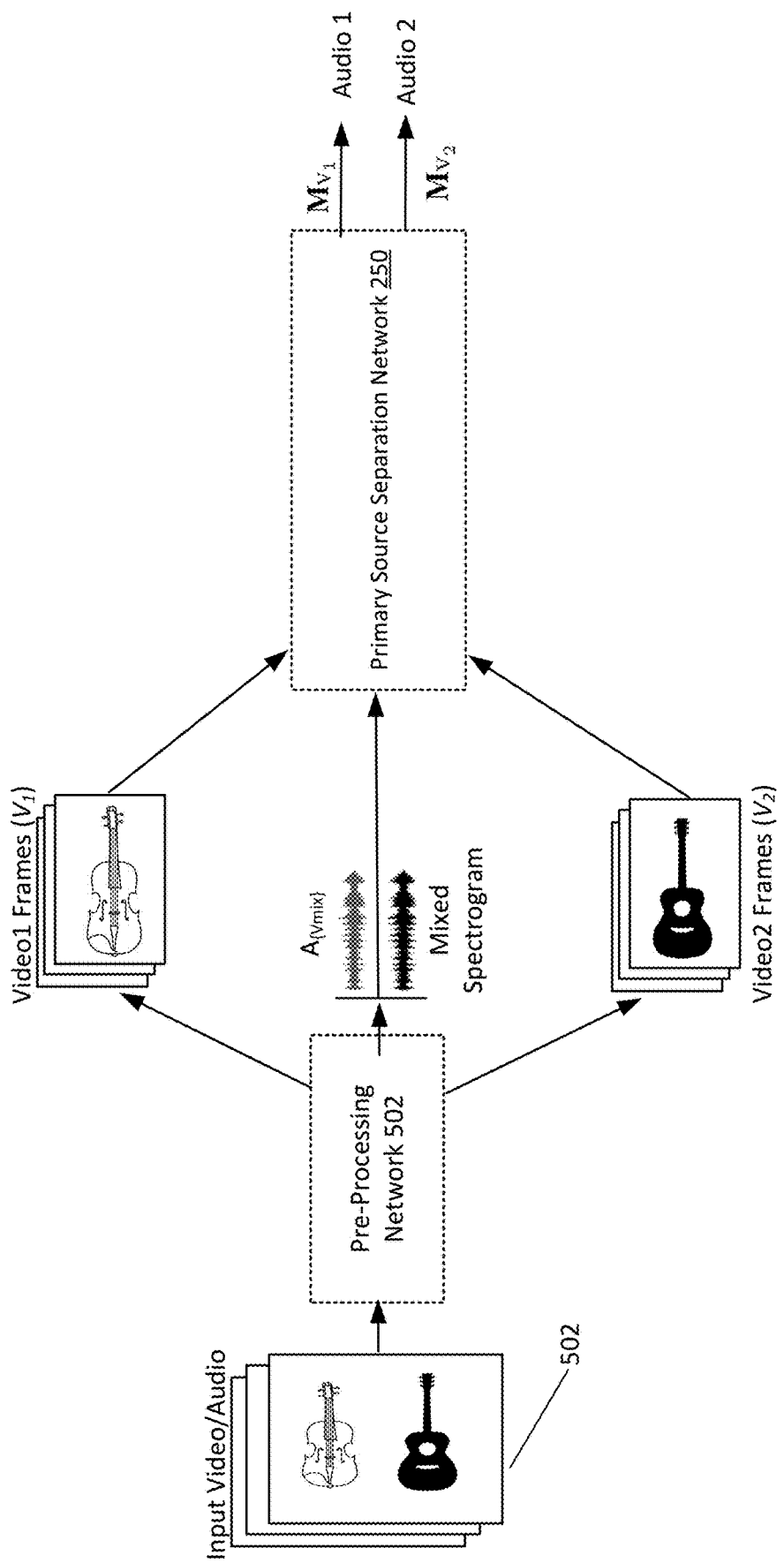
FIG. 5 is a schematic block diagram of the separation network of FIG. 2 in an inference application.

Upon the completion of training, primary source audio separation network 250 can be deployed to perform an audio separation task. Although two discrete videos ($V_1$ and $V_2$), each including a different sound generating source or object, are shown in FIG. 2, in an example application the multiple sound generating sources or objects can be present in a single input video. In this regard, FIG. 5 is a block diagram showing an example of primary source audio separation network 250 in an inference application. An input video 502 with associated audio is provided as input to a pre-processing network 502. Network 502 includes a trained neural network that detects and identifies different sound producing objects within the input video 502 and outputs a discrete separate video (e.g., $V_1$, $V_2$) that includes isolated video for each object. For example, Network 502 may be trained to perform object detection to detect discrete objects (e.g., guitar and violin), and output a respective video (e.g., violin video $V_1$ and guitar video $V_2$) for each object. The pre-processing network 502 can also include provide mixed spectrogram $A_{\{Vmix\}}$. It will be noted that the audio associated with input video 502 is already a mixed audio that includes the sounds generated by all sound generating objects that appear in the input video 502 such that the mixed spectrogram $A_{\{Vmix\}}$ represents the original audio without requiring that audio from multiple videos be combined as during the training process. The primary source separation network 250 receives the separated videos $V_1$, $V_2$ as inputs, together with the spectrogram $A_{\{Vmix\}}$ for input video 502 and outputs respective separated audio mask s $M_{V1}$ and $M_{V2}$, which in turn are applied to the mixed spectrogram $A_{\{Vmix\}}$ to extract Audio 1 and Audio 2 signals that respectively correspond to the sound producing objects appearing in separated videos $V_1$ and $V_2$. For example, Audio 1 can represent sound generated by a violin and Audio 2 can represent sound generated by a guitar in the illustrated example.

The paragraphs below identify at least some innovative features of the present disclosure and corresponding advantageous effects:

(1) Audio visual sound source separation in the wild and in the absence of labeled data Reduce need for costly labeled data—Reduce the need for expensive re-training the method for different scenarios in production— More useful in real-world applications due to better generalization (2) Meta Auxiliary Learning in audio visual sound source separation Improves all the metrics for the current methods—Accelerates the inference performance— Enables adaptability to new situations in test time.

(3) This solution is model and domain agnostic. Hence, neither model nor domain specific.

(4) Applicable to any audio-visual source separation model for performance improvement—instrument separation, speech separation, in the wild separation can benefit from this approach.

The disclosed solution for audio-visual sound source separation can be adapted to, and used for a large number of tasks that require video and audio at the same time, including: Speech source separation; Audio visual object localization; Audio visual generation; Audio visual retrieval (Using audio or an image to search for its counterpart in another modality); and Audio visual speech recognition for unknown speakers.

Figure 2:
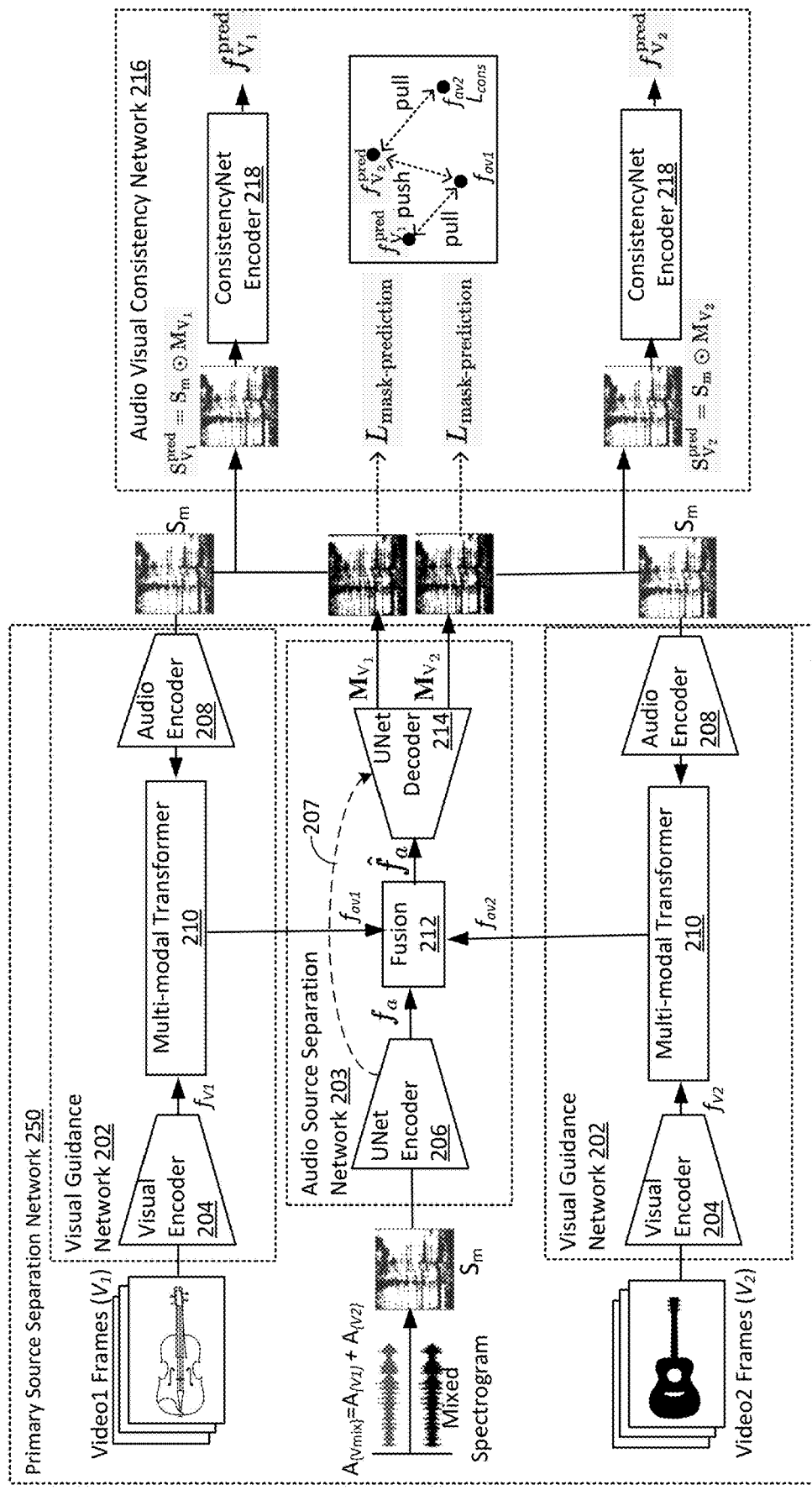
FIG. 2 is a schematic block diagram of a model architecture for a separation network according to example embodiments.
Figure 6:
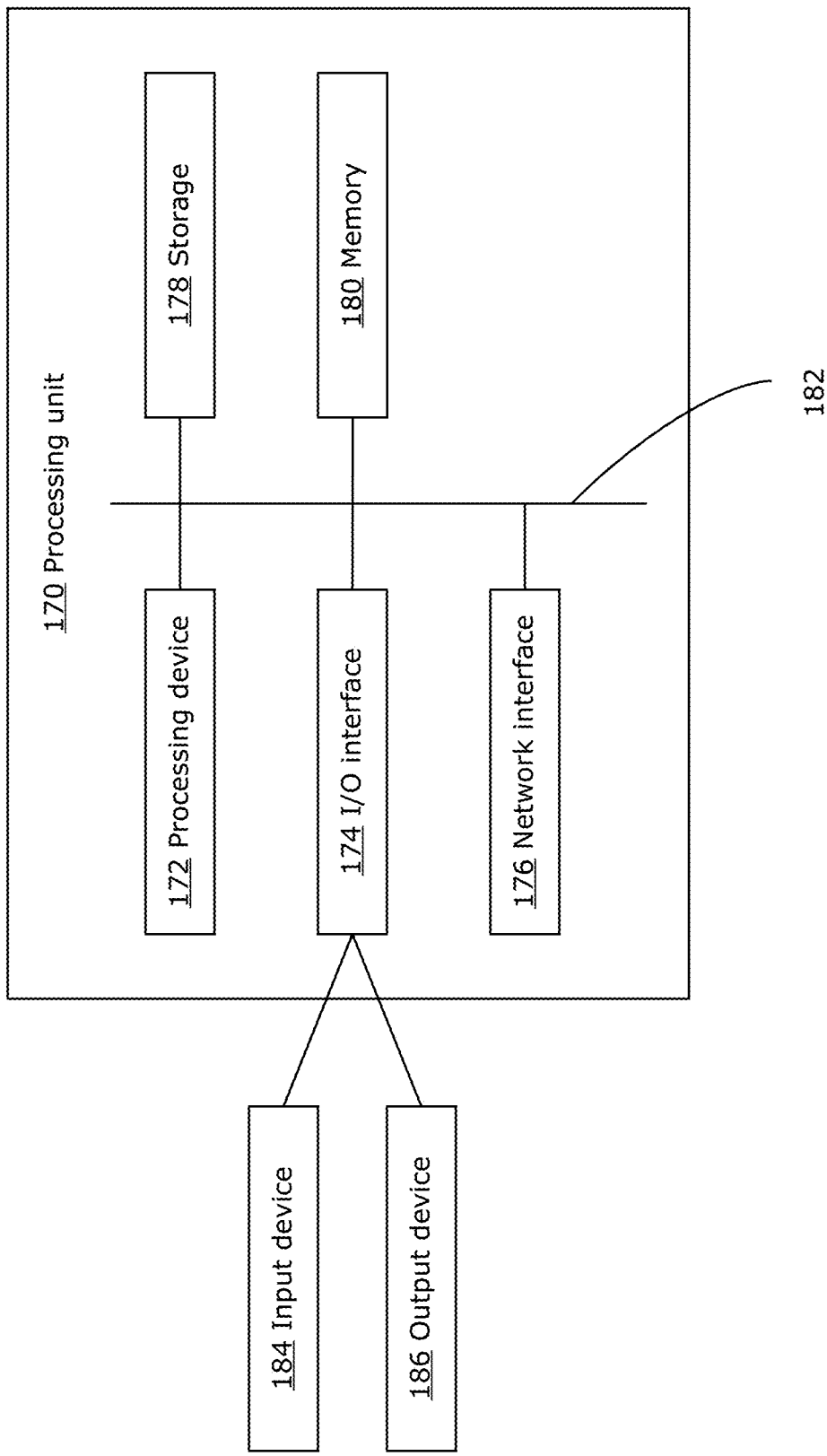
FIG. 6 is a block diagram of a processing unit to which example aspects of the disclosure can be applied.

FIG. 6 is a block diagram of an example processing unit 170, which may be used to implement one or more of the components shown in FIG. 2. Processing unit 170 may be used in a computer device to execute machine executable instructions that implement one or more of the modules or parts of the modules of network 200. Other processing units suitable for implementing embodiments described in the present disclosure may be used, which may include components different from those discussed below.

The processing unit 170 may include one or more processing devices 172, such as a processor, a microprocessor, a general processor unit (GPU), a hardware accelerator, an application-specific integrated circuit (ASIC), a field-programmable gate array (FPGA), a dedicated logic circuitry, or combinations thereof. The processing unit 170 may also include one or more input/output (I/O) interfaces 174, which may enable interfacing with one or more appropriate input devices 184 and/or output devices 186. The processing unit 170 may include one or more network interfaces 176 for wired or wireless communication with a network (for example a network linking user device 102 and server 104)

The processing unit 170 may also include one or more storage units 178, which may include a mass storage unit such as a solid state drive, a hard disk drive, a magnetic disk drive and/or an optical disk drive. The processing unit 170 may include one or more memories 180, which may include a volatile or non-volatile memory (e.g., a flash memory, a random access memory (RAM), and/or a read-only memory (ROM)). The memory(ies) 180 may store instructions for execution by the processing device(s) 172, such as to carry out examples described in the present disclosure. The memory(ies) 180 may include other software instructions, such as for implementing an operating system and other applications/functions.

There may be a bus 182 providing communication among components of the processing unit 170, including the processing device(s) 172, I/O interface(s) 174, network interface(s) 176, storage unit(s) 178 and/or memory(ies) 180. The bus 182 may be any suitable bus architecture including, for example, a memory bus, a peripheral bus or a video bus.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

Although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The following documents are each incorporated herein by reference.

REFERENCES

Afouras, T. a. (2018). The conversation: Deep audio-visual speech enhancement. *arXiv preprint arXiv:*1804.04121.

Afouras, T. a. (2019). My lips are concealed: Audio-visual speech enhancement through obstructions. *arXiv preprint arXiv:*1907.04975.

Azimi, F. a. (2022). Self-supervised test-time adaptation on video data. *WACV.*

Barzelay, Z. a. (2007). Harmony in motion. *CVPR.* IEEE.

Chandna, P. a. (2017). *Monoaural audio source separation using deep convolutional neural networks.* International Conference on Latent Variable Analysis and Signal Separation.

Chatterjee, M. a. (2021). Visual scene graphs for audio source separation. *ICCV.*

Chen, D. a. (2022). Contrastive Test-Time Adaptation. *CVPR.*

Chi, Z. a. (2021). Test-time fast adaptation for dynamic scene deblurring via meta-auxiliary learning. *CVPR.*

Chi, Z. a. (2022). MetaFSCIL: A Meta-Learning Approach for Few-Shot Class Incremental Learning. *CVPR.*

Choi, M. a. (2020). Scene-adaptive video frame interpolation via meta-learning. *CVPR.*

Chung, S.-W. a.-G. (2020). Facefilter: Audio-visual speech separation using still images. *arXiv preprint arXiv:* 2005.07074.

Cichocki, A. a.-i. (2009). *Nonnegative matrix and tensor factorizations: applications to exploratory multi-way data analysis and blind source separation.* John Wiley \& Sons.

Ephrat, A. a. (2018). Looking to listen at the cocktail party: A speaker-independent audio-visual model for speech separation. *arXiv preprint arXiv:*1804.03619.

Finn, C. a. (2017). Model-agnostic meta-learning for fast adaptation of deep networks. *ICML.*

Fisher III, J. W. (2000). Learning joint statistical models for audio-visual fusion and segregation. *Advances in neural information processing systems.*

Gabbay, A. a. (2017). Visual speech enhancement. *arXiv preprint arXiv:*1711.08789.

Gan, C. a. (2020). Music gesture for visual sound separation. *CVPR.*

Gao, R. a. (2018). Learning to separate object sounds by watching unlabeled video. *ECCV.*

Gao, R. a. (2019). Co-separating sounds of visual objects. *CVPR.*

Gao, R. a. (2021). Visualvoice: Audio-visual speech separation with cross-modal consistency. *CVPR.* IEEE.

Grais, E. M. (2017). Two-stage single-channel audio source separation using deep neural networks. *IEEE/ACM Transactions on Audio, Speech, and Language Processing.* IEEE.

He, K. a. (2016). Deep residual learning for image recognition. *CVPR.*

Hershey, J. R. (2016). Deep clustering: Discriminative embeddings for segmentation and separation. *ICASSP.* IEEE.

Ji, Y. a. (2022). Self-supervised Fine-grained Cycle-Separation Network (FSCN) for Visual-Audio Separation. *IEEE Transactions on Multimedia.* IEEE.

Kim, C. a.-H. (2018). On learning associations of faces and voices. *ACCV.*

Korbar, B. a. (2018). Cooperative learning of audio and video models from self-supervised synchronization. *NeurIPS.*

Li, B. a. (2017). See and listen: Score-informed association of sound tracks to players in chamber music performance videos. *ICASSP.* IEEE.

Liu, S. a. (2019). Self-supervised generalisation with meta auxiliary learning. *NeurIPS.*

Lu, J. a. (2019). Vilbert: Pretraining task-agnostic visiolinguistic representations for vision-and-language tasks. *NeuIPS*.

Lu, K. a. (2020). From depth what can you see? Depth completion via auxiliary image reconstruction. *CVPR*.

Mitsufuji, N. T. (2019). Recursive speech separation for unknown number of speakers. *INTERSPEECH*.

Nagrani, A. a. (2018). Learnable pins: Cross-modal embeddings for person identity. *ECCV*.

Owens, A. a. (2018). Audio-visual scene analysis with self-supervised multisensory features. *ECCV*.

Parekh, S. a. (2017). Motion informed audio source separation. *ICASSP*. IEEE.

Park, S. a. (2019). Few-shot adaptive gaze estimation. *CVPR*.

Park, S. a. (2020). Fast adaptation to super-resolution networks via meta-learning. *ECCV*.

Pu, J. a. (2017). Audio-visual object localization and separation using low-rank and sparsity. *ICASSP*. IEEE.

Rahimi, A. a. (2022). Reading To Listen at the Cocktail Party: Multi-Modal Speech Separation. *CVPR*.

Rahman, T. a. (2021). TriBERT: Human-centric Audio-visual Representation Learning. *NeurIPS*.

Ronneberger, O. a. (2015). U-net: Convolutional networks for biomedical image segmentation. *International Conference on Medical image computing and computer-assisted intervention*.

Rouditchenko, A. a. (2019). Self-supervised segmentation and source separation on videos. *CVPR Workshops*.

Sedighin, F. a.-Z. (2016). Two multimodal approaches for single microphone source separation. *EUSIPCO*. IEEE.

Simonyan, K. a. (2014). Very deep convolutional networks for large-scale image recognition. *arxiv*.

Simpson, A. J. (2015). *Deep karaoke: Extracting vocals from musical mixtures using a convolutional deep neural network*. International Conference on Latent Variable Analysis and Signal Separation.

Smaragdis, P. a. (2003). Audio/visual independent components. *ICA*.

Smaragdis, P. a. (2003). *Non-negative matrix factorization for polyphonic music transcription*. IEEE Workshop on Applications of Signal Processing to Audio and Acoustics.

Sun, Y. a. (2020). Test-time training with self-supervision for generalization under distribution shifts. *ICML*.

Tian, Y. a. (2021). Cyclic co-learning of sounding object visual grounding and sound separation. *CVPR*.

Vaswani, A. a. (2017). Attention is All you Need. *NeurIPS*.

Virtanen, T. (2007). *Monaural sound source separation by nonnegative matrix factorization with temporal continuity and sparseness criteria*. IEEE transactions on audio, speech, and language processing.

Wang, D. a. (2018). *Supervised speech separation based on deep learning: An overview*. IEEE/ACM Transactions on Audio, Speech, and Language Processing.

Wang, D. a. (2021). Tent: Fully Test-Time Adaptation by Entropy Minimization. *ICLR*.

Wu, Y. a. (2022). Few-Shot Learning of Compact Models via Task-Specific Meta Distillation. *WACV*.

Xu, X. a. (2019). Recursive visual sound separation using minus-plus net. *ICCV*.

Yu, D. a.-H. (2017). Permutation invariant training of deep models for speaker-independent multi-talker speech separation. *ICASSP*. IEEE.

Zhao, H. a. (2018). The sound of pixels. *ECCV*.

Zhao, H. a.-C. (2019). The sound of motions. *ICCV*.

Zhong, T. a. (2022). Meta-DMoE: Adapting to Domain Shift by Meta-Distillation from Mixture-of-Experts. *NeurIPS*.

Zhou, X. a. (2022). SeCo: Separating Unknown Musical Visual Sounds with Consistency Guidance. *arXiv preprint arXiv:*2203.13535.

Zhu, L. a. (2020). Visually guided sound source separation using cascaded opponent filter network. *ACCV*.

Zhu, L. a. (2021). Leveraging category information for single-frame visual sound source separation. *EUVIP*.

Zhu, L. a. (2022). Visually guided sound source separation and localization using self-supervised motion representations. *CVPR*.

Zhu, L. a. (2022). V-slowfast network for efficient visual sound separation. *WACV*.

The invention claimed is:

1. A method for separating sounds that are generated by discrete sound producing objects, comprising:
receiving an audio spectrogram that represents first sounds generated by a first sound producing object and second sounds generated by a second sound producing object;
receiving a first video of the first sound producing object generating the first sounds;
receiving a second video of the second sound producing object generating the second sounds;
generating an audio feature by applying a first audio encoder to the audio spectrogram;
generating an audio token by applying a second audio encoder to the audio spectrogram;
generating a first visual token by applying a visual encoder to the first video;
generating a first audio-visual (AV) feature by applying a transformer encoder to the audio token and the first visual token;
generating a first fused feature that is combination of the first AV feature and the audio feature;
generating a first separated audio mask by applying a decoder to the first fused feature;
generating a second visual token by applying the visual encoder to the second video;
generating a second audio-visual (AV) feature by applying the transformer encoder to the audio token and the second visual token;
generating a second fused feature that is combination of the second AV feature and the audio feature;
generating a second separated audio mask by applying the decoder to the second fused feature, wherein the first audio encoder, the decoder, the visual encoder, the second audio encoder and the transformer are trained collectively to generate the first separating audio mask and the second separating audio mask;
outputting a representation of the first sounds from the audio spectrogram based on the first separated audio mask; and
outputting a representation of the second sounds from the audio spectrogram based on the second separated audio mask.

2. The method of claim 1 wherein the transformer encoder comprises a co-attention layer for generating the first AV feature and the second AV feature.

3. The method of claim 1 comprising:
mixing a first audio signal associated with the first video and a second audio signal associated with the second video to provide the audio spectrogram.

4. The method of claim 3 wherein the first sound producing object and the second sound producing object are respective musical instruments.

5. The method of claim 1 wherein collectively training the first audio encoder, the decoder, the visual encoder, the second audio encoder and the transformer comprises training an audio visual consistency network to learn a synchronization of the representation of the first sounds from the audio spectrogram with the first video and a synchronization of the representation of the second sounds from the audio spectrogram with the second video.

6. The method of claim 5 wherein training the audio visual consistency network comprises:
generating a first sound output feature by applying a consistency encoder to the representation of the first sounds;
generating a second sound output feature by applying the consistency encoder to the representation of the second sounds; and
adjusting parameters of the consistency encoder based on a comparing of the first sound output feature to the first AV feature and the second sound output feature to the second AV feature.

7. The method of claim 6 wherein collectively training the first audio encoder, the decoder, the visual encoder, the second audio encoder and the transformer comprises adjusting parameters of the first audio encoder, the decoder, the video encoder and the second audio encoder based on comparing the first separated audio mask and the second separated audio mask to respective ground truth masks.

8. The method of claim 7 wherein each of the first audio encoder, the decoder, the video encoder, the second audio encoder and the consistency encoder comprises a respective convolution neural network configured by a respective set of parameter weights.

9. The method of claim 7 wherein the collective training comprises:
(1) performing a plurality of inner loop training iterations to train the audio visual consistency network, wherein the parameters of the consistency encoder are adjusted during each inner loop training iteration based on a first defined loss objective;
(2) at the completion of each inner loop training iteration, performing an outer loop training iteration adjusting parameters of the first audio encoder, the decoder, the video encoder and the second audio encoder based on a second defined loss objective; and
(3) repeating (1) and (2) until a defined convergence criteria is reached.

10. A computer system configured to separate sounds that are generated by discrete sound producing objects, the computer system comprising one or more processing units configured by executable instructions to:
receive an audio spectrogram that represents first sounds generated by a first sound producing object and second sounds generated by a second sound producing object;
receive a first video of the first sound producing object generating the first sounds;
receive a second video of the second sound producing object generating the second sounds;
generate an audio feature by applying a first audio encoder to the audio spectrogram;
generate an audio token by applying a second audio encoder to the audio spectrogram;
generate a first visual token by applying a visual encoder to the first video;
generate a first audio-visual (AV) feature by applying a transformer encoder to the audio token and the first visual token;
generate a first fused feature that is combination of the first AV feature and the audio feature;
generate a first separated audio mask by applying a decoder to the first fused feature;
generate a second visual token by applying the visual encoder to the second video;
generate a second audio-visual (AV) feature by applying the transformer encoder to the audio token and the second visual token;
generate a second fused feature that is combination of the second AV feature and the audio feature;
generate a second separated audio mask by applying the decoder to the second fused feature, wherein the first audio encoder, the decoder, the visual encoder, the second audio encoder and the transformer are trained collectively to generate the first separating audio mask and the second separating audio mask;
output a representation of the first sounds from the audio spectrogram based on the first separated audio mask; and
output a representation of the second sounds from the audio spectrogram based on the second separated audio mask.

11. The system of claim 10 wherein the transformer encoder comprises a co-attention layer for generating the first AV feature and the second AV feature.

12. The system of claim 10 wherein the one or more processing units are configured by executable instructions to mix a first audio signal associated with the first video and a second audio signal associated with the second video to provide the audio spectrogram.

13. The system of claim 10 wherein collectively training the first audio encoder, the decoder, the visual encoder, the second audio encoder and the transformer comprises training an audio visual consistency network to learn a synchronization of the representation of the first sounds from the audio spectrogram with the first video and a synchronization of the representation of the second sounds from the audio spectrogram with the second video.

14. The system of claim 13 wherein training the audio visual consistency network comprises:
generating a first sound output feature by applying a consistency encoder to the representation of the first sounds;
generating a second sound output feature by applying the consistency encoder to the representation of the second sounds; and
adjusting parameters of the consistency encoder based on a comparing of the first sound output feature to the first AV feature and the second sound output feature to the second AV feature.

15. The system of claim 14 wherein collectively training the first audio encoder, the decoder, the visual encoder, the second audio encoder and the transformer comprises adjusting parameters of the first audio encoder, the decoder, the video encoder and the second audio encoder based on comparing the first separated audio mask and the second separated audio mask to respective ground truth masks.

16. The system of claim 15 wherein each of the first audio encoder, the decoder, the video encoder, the second audio encoder and the consistency encoder comprises a respective convolution neural network configured by a respective set of parameter weights.

17. The system of claim 15 wherein the collective training comprises:
(1) performing a plurality of inner loop training iterations to train the audio visual consistency network, wherein the parameters of the consistency encoder are adjusted during each inner loop training iteration based on a first defined loss objective;

(2) at the completion of each inner loop training iteration, performing an outer loop training iteration adjusting parameters of the first audio encoder, the decoder, the video encoder and the second audio encoder based on a second defined loss objective; and (3) repeating (1) and (2) until a defined convergence criteria is reached.

18. A non-transitory computer readable medium containing program instructions, which when executed by a computer, cause the computer to perform a method of separating sounds that are generated by discrete sound producing objects, comprising:

receiving an audio spectrogram that represents first sounds generated by a first sound producing object and second sounds generated by a second sound producing object;

receiving a first video of the first sound producing object generating the first sounds;

receiving a second video of the second sound producing object generating the second sounds;

generating an audio feature by applying a first audio encoder to the audio spectrogram;

generating an audio token by applying a second audio encoder to the audio spectrogram;

generating a first visual token by applying a visual encoder to the first video;

generating a first audio-visual (AV) feature by applying a transformer encoder to the audio token and the first visual token;

generating a first fused feature that is combination of the first AV feature and the audio feature;

generating a first separated audio mask by applying a decoder to the first fused feature;

generating a second visual token by applying the visual encoder to the second video;

generating a second audio-visual (AV) feature by applying the transformer encoder to the audio token and the second visual token;

generating a second fused feature that is combination of the second AV feature and the audio feature;

generating a second separated audio mask by applying the decoder to the second fused feature, wherein the first audio encoder, the decoder, the visual encoder, the second audio encoder and the transformer are trained collectively to generate the first separating audio mask and the second separating audio mask;

outputting a representation of the first sounds from the audio spectrogram based on the first separated audio mask; and outputting a representation of the second sounds from the audio spectrogram based on the second separated audio mask.

* * * * *